United States Patent
Peterson et al.

(10) Patent No.: US 6,173,321 B1
(45) Date of Patent: Jan. 9, 2001

(54) USING A SYSTEMS NETWORK ARCHITECTURE LOGICAL UNIT ACTIVATION REQUEST UNIT AS A DYNAMIC CONFIGURATION DEFINITION IN A GATEWAY

(75) Inventors: Mitchell Owen Peterson, Seattle; Brian Dudley Silverman, Bellevue, both of WA (US)

(73) Assignee: Attachmate Corporation, Bellevue, WA (US)

( * ) Notice: Under 35 U.S.C. 154(b), the term of this patent shall be extended for 0 days.

(21) Appl. No.: 09/440,480

(22) Filed: Nov. 15, 1999

Related U.S. Application Data

(63) Continuation-in-part of application No. 09/075,458, filed on Jul. 9, 1998.

(51) Int. Cl.[7] .................................................. G06P 15/177
(52) U.S. Cl. ........................................... 709/220; 709/221
(58) Field of Search .................................... 709/220, 221, 709/227, 230; 710/8, 10, 15, 16, 17

(56) References Cited

U.S. PATENT DOCUMENTS

| | | | |
|---|---|---|---|
| 5,586,261 | * 12/1996 | Brooks et al. ...................... | 709/238 |
| 6,018,770 | * 1/2000 | Little et al. ........................... | 709/223 |
| 6,078,964 | * 6/2000 | Ratcliff et al. ....................... | 709/300 |

OTHER PUBLICATIONS

IBM Technical Disclosure Bulletin, vol. 39, No. 11, pp. 153–160, Nov. 1996.*
IBM Technical Disclosure Bulletin, vol. 26, No. 10A, pp. 4928–4930, Mar. 1984.*
Ogle, et al., "Dynamically Selecting Protocols for Socket Applications", IEEE Network, 0890–8044/92, May 1993.*

* cited by examiner

*Primary Examiner*—Dung C. Dinh
*Assistant Examiner*—Bradley Edelman
(74) *Attorney, Agent, or Firm*—Brian L. Johnson; George C. Rondeau, Jr.; Seed IP Law group, PLLC

(57) ABSTRACT

An improved method and system for initializing the logical units (LUs) in a Gateway between an SNA network having a mainframe host computer and another network. An activation procedure derives the Table of Boundary LUs on the mainframe host computer by noting the device logical unit numbers within the set of 'Activate Logical Unit' (ACTLU) SNA Request Units. If the mainframe host computer includes an LU in its Table of Boundary LUs, then the activation procedure creates a corresponding LU in the Gateway. The activation procedure also marks each of the created LUs in the Gateway as active. The newly created LUs are then added to the resource pool of LUs available to the network. Additional aspects include a method for assigning a logical unit type to an LU based upon whether a Bind request is received from the mainframe host computer within a certain amount of time after sending a positive sense code to the mainframe host computer.

19 Claims, 13 Drawing Sheets

GATEWAY MATRIX

| PU 001 | LU 001 | ... | LU 011 | LU 012 | LU 013 | ... | LU 201 | ... | LU 255 |
|---|---|---|---|---|---|---|---|---|---|
| PU 002 | LU 001 | LU 002 | LU 003 | ... | LU 014 | ... | LU 253 | LU 254 | LU 255 |
| PU 003 | ... | LU 010 | ... | LU 081 | ... | LU 130 | LU 131 | ... | |
| PU 004 | LU 001 | LU 002 | ... | LU 080 | ... | LU 125 | ... | LU 255 | |
| PU 005 | LU 001 | LU 002 | LU 003 | ... | ... | LU 125 | LU 126 | ... | |
| PU 006 | ... | ... | ... | ... | ... | LU 254 | ... | | |
| PU 007 | ... | LU 008 | LU 009 | LU 010 | ... | ... | LU 255 | | |
| PU 008 | LU 001 | ... | ... | ... | ... | LU 255 | | | |
| PU 009 | ... | LU 020 | LU 021 | LU 022 | ... | LU 250 | ... | | |
| PU 010 | LU 001 | ... | ... | ... | | | | | |
| PU 011 | LU 001 | ... | LU 139 | LU 140 | LU 141 | ... | ... | | |
| PU 012 | ... | LU 010 | ... | ... | ... | LU 253 | LU 254 | LU 255 | |

*Fig. 5 (Prior Art)*

USING A SYSTEMS NETWORK ARCHITECTURE LOGICAL UNIT ACTIVATION REQUEST UNIT AS A DYNAMIC CONFIGURATION DEFINITION IN A GATEWAY

CROSS-REFERENCE TO RELATED APPLICATION

This application is a continuation-in-part of U.S. Ser. No. 09/075,458, filed Jul. 9, 1998 patent pending.

TECHNICAL FIELD

The present invention relates to computer programming and, in particular, to a method and system for dynamically indicating the active logical units (LUs) of a Systems Network Architecture (SNA) communications network in a Gateway between the SNA network and another computing network.

BACKGROUND OF THE INVENTION

The Systems Network Architecture (SNA) is a widely used and highly successful communications framework developed by IBM that defines network functions and establishes standards for enabling computers to exchange and process data. SNA provides a coherent structure that enables users to establish and manage their networks and to change or expand them in response to new requirements and technologies. SNA includes products, combinations of hardware and programs designed in accordance with SNA specifications. In addition to a large number of computer terminals for both specific industries and general applications, IBM's SNA product line includes host processors, communication controllers, adapters, modems, and data encryption units. The SNA product line also includes a variety of programs and programming subsystems, such as telecommunications access methods, network management programs, distributed application programs and network control programs (NCPs).

SNA describes rules that enable users to transmit and receive information through their computer networks. As shown in FIG. 1, SNA utilizes a tree-structured architecture with a mainframe host computer 101 acting as the network control center. The architecture with a mainframe host computer 101 acting as the network control center. The network also includes terminals 102, front-end processors 103, workstations 104, and cluster controllers 105. The boundaries described by the mainframe host computer 101, front-end processors 103, cluster controllers 105, workstations 104 and terminals 102 are referred to as the network's domain 108. SNA network nodes include the various equipment attached to the network, such as the front-end processors 103 and the terminals 102. Unlike a switched telephone network that establishes physical paths between terminals for the duration of a session, SNA establishes a logical path between network nodes, such as the terminals 102, and routes each message with addressing information contained in the SNA protocol.

FIG. 2 displays the SNA communication protocol stack. SNA utilizes a communications stack for transferring data between computers, such as between the mainframe host computer 101 and the workstation 104 shown in FIG. 1 SNA utilizes five layers for communication within a domain: a function management layer 201, a data flow control layer 202, a transmission control layer 203, a path control layer 204, and a data-link control layer 205. The layers form a sequence from a lowest layer (the data-link control layer 205) to the highest layer (the function management layer 201). The layers divide the processing necessary for communicating between computers into discrete units. The data-link control layer 205 in the communications stack typically interacts with the physical medium used for transferring the data, such as coaxial cables. The function management layer 201, as the top layer of the communications stack, provides services to application programs, and the middle layers of the communications stack typically are responsible for routing and maintaining a connection.

A local computer transfers data to a remote computer when an application program first passes the data to the function management layer 201 of the communications stack of the local computer. The function management layer 201 then processes the data and sends the data to the next lowest layer in the communications stack, the data flow control layer 202. Thereafter, each layer in turn processes the data until the data reaches the bottom layer, the data-link control layer 205, where the data is sent to the remote computer over the transfer medium. The data-link control layer 205, as the bottom layer of the communications stack, may also receive data from the transfer medium and pass the data up the communications stack. Each layer performs its specific processing on the data until the data reaches the function management layer 201. The function management layer 201 processes the data and sends the data to an application program.

SNA utilizes various protocols including the Synchronous Data Link Control (SDLC), Data Link Control (DLC 802.2), and Data Link Control over Channel or Fiber Optics (DLC Channel/ESCON) protocols. SDLC is a bit-oriented synchronous communications protocol developed by IBM. SDLC provides high speed data transfer between SNA devices, such as the mainframe host computer 101 and the workstation 104 shown in FIG. 1. SDLC forms data into packets, known as frames, with as many as 128 frames transmitted sequentially in a given data transfer. As shown in FIG. 3, each frame 300 comprises a header 301, text 302, and a trailer 303. The header 301 consists of framing bits 301a indicating the beginning of the frame, address information 301b and various control data 301c. The text 302, or data payload, consists of as many as seven blocks of data, each having as many as 512 characters. A Request Unit (RU) is a basic unit of data in SNA. The trailer 303 comprises a frame check sequence (FCS) 303a for error detection and correction. A set of framing bits 303b mark the end of the frame 300. SDLC supports device communications generally conducted over high speed, dedicated private line, digital circuits. SDLC can operate in either point-to-point or multipoint network configurations. DLC over Local Area Network (LAN) specification 802.2 Ethernet or Token Ring, Bus and Tag Channel, and Enterprise System Connection (ESCON) may all be utilized as low-level protocols to accomplish SNA traffic exchange with a mainframe computer.

A logical unit (LU) is an SNA access port for network nodes such as the workstation 104 shown in FIG. 1. Each LU denotes the beginning or end of a communications system. In a bisynchronous network, an LU is a port through which a user accesses network services. An LU may support sessions with a system services control point (SSCP) on the mainframe host computer and with other LUs. LU 6.2, also known as advanced program-to-program communication (APPC), is a version of the LU that allows for peer-to-peer or program-to-program communications. The LU 6.2 protocol standard frees application programs from network-specific details. For example, on an IBM PC, an LU 6.2- equipped program accepts commands and passes them on to an SDLC card that communicates directly with the mainframe host computer or a token ring handler. LU 6.2 also creates a transparent environment for application-to-application communications, regardless of the types of systems used or their relative locations. For example, IU 6.2 enables users to develop application programs for peer-to-peer communications between PCs and IBM host computers. LU 6.2 also increases the processing power of the PC without the constraints of mainframe-based slave devices, such as the IBM 3274/3276 controllers.

Other LU types include LU 0 through LU 4, LU 6.1, and LU 7. LU 0 is non-architected so that transmitted data can be interpreted based upon user-defined rules. LU 0 is a peer-to-peer (program-to-program) type of data communication. The application program interface is more flexible but has fewer built-in capabilities than LU 6.2. LU 0 is mainly used for applications, such as file transfers, in which the protocols used are defined by the file transfer programs running at each end of the communication system.

LU 1 serves in sending SNA Character String (SCS) data streams from host-based applications to remote terminals, such as 3270 printers or 3770 RJE type computer terminals. LU 2 is suited for communications to 3270-type computer terminals. Communications sessions with 3270-type printers use LU 3. LU 4 is a peer-to-peer communications method that has been superceded by LU 6.2. LU 6.1 is applicable for program-to-program communications where the program at one end is an IBM type such as Information Management System (IMS). LU 7 serves communications between an application program and a 5250-type computer terminal.

A physical unit (PU) is the SNA component that manages and monitors the resources of a network node, such as the network node's attached links and adjacent link stations. SNA utilizes a classification system for PUs similar to a classification system used for network node types. PU 2.0 and 2.1 are protocols that allow applications written to APPC and interpreted by LU 6.2 that respectively access a mainframe host computer (PU 2.0) and a token ring local area network (LAN) (PU 2.1). PU type 2 refers to the management services in an SNA network node that always contains one PU representing the device and its resources to the network. PU type 2 is often referred to as a "cluster controller." PU type 4 is an IBM SNA front-end processor, such as the front-end processors 103 shown in FIG. 1. PU type 5 is an IBM SNA mainframe, such as System/370 or System/390. PU type 5 runs SNA's Virtual Telecommunications Access Method (VTAM) to handle data communications. VTAM will be discussed further below.

A systems services control point (SSCP) is an SNA term for software that manages the available connection services to be used by the network control program (NCP). There is only one SSCP in an SNA network domain, such as the domain 108 shown in FIG. 1, and the software normally resides in the mainframe host computer 101, such as a mainframe host computer of the IBM system/370 mainframe family. An LU may support sessions with the mainframe host computer based SSCP.

A Network Addressable Unit (NAU) in SNA may include both an LU, a PU, or an SSCP representing the origin or destination of information transmitted by the path control layer of an SNA network, such as the path control layer 204 of the SNA communications stack shown in FIG. 2. Each SNA network node has a unique address. The SNA Node Type (NT) provides the SNA classification of a network device based on the protocols it supports and the Network Addressable Units (NAUs) it contains. For example, Type 1 and Type 2 nodes are peripheral nodes, and Type 4 and 5 nodes are sub-area nodes.

The Virtual Telecommunications Access Method (VTAM) is a program component in an IBM computer that processes many of the SNA communications tasks for an application program. VTAM performs addressing and control path functions in an SNA network, allowing a terminal or an application to communicate with and transfer data to another application along a transmission medium. For example, in an IBM 370 or compatible computer, VTAM provides users at remote terminals with access to applications in the mainframe host computer. VTAM typically resides in the mainframe host computer. VTAM also provides resource sharing, a technique for efficiently using a network to reduce transmission costs.

A Gateway provides an entrance into and exit from a communications network such as an SNA network. A network systems engineer typically places a Gateway between two networks, such as an SNA network and a network utilizing another protocol. The Gateway functions as an electronic repeater device that intercepts and steers electronic signals from one network to another, such as from an SNA network to another type of network. Devices using asynchronous or binary synchronous communications may access SNA only through protocol converters such as a Gateway. Generally, a Gateway includes a signal conditioner that filters out unwanted noise and control characters. In data networks, Gateways are typically a node on both of two networks that connects two otherwise incompatible networks. For example, personal computer (PC) users on a local area network (LAN) may require a Gateway in order to access to a mainframe computer that does not utilize the same communication protocols as the PC. Thus, Gateways on data networks typically perform code and protocol conversion processes. FIG. 4 illustrates a Gateway 401 connecting the SNA network shown in FIG. 1 to another network 402.

In any computing system, faster and more efficient operations are always desirable. The complexity and sophistication of modem computing system designs, such as that provided by SNA, often render observation and diagnosis of latent inefficiencies extremely difficult. In addition, computer programmers typically follow the if-it-ain't-broke-don't-fix-it paradigm for improving computing systems and its corollary squeaky-wheel-gets-the-grease methodology. Unfortunately, the goal of achieving the highest possible levels of computing system efficiency may be thwarted by these approaches when a computing system or computing network functions adequately but at an efficiency level below its maximum potential due to an inherent inefficiency that passes undetected because the inefficiency is not so severe as to render the system inoperable.

SUMMARY OF THE INVENTION

Aspects of the invention provide an improved method and system for initializing the active logical units (LUs) in a Gateway between an SNA network having a mainframe host computer and another network. These aspects include a method for assigning a logical unit type to a logical unit in a Gateway between an SNA network having a host computer and another network in the SNA network. The method involves sending a positive sense code in response to an Activate Logical Unit (ACTLU) Request Unit (RU) for the logical unit. Further aspects involve measuring time from the sending of the positive sense code, and if no Bind request for the logical unit has been received within a predetermined amount of time from the time of the sending of the positive sense code, then a predetermined logical unit type is assigned to the logical unit. Additional aspects include the predetermined amount of time being related to demand on the host computer and related to latency involving the SNA network.

BRIEF DESCRIPTION OF THE DRAWINGS

A preferred embodiment of the present invention will be described below relative to the following Figures. Note that similar elements and steps in the Figures have the same reference number.

FIG. 5 illustrates an exemplary Gateway Matrix having LUs and PUs.

DETAILED DESCRIPTION OF THE INVENTION

The present invention arises from the inventors' discovery of a gross inefficiency in the Systems Network Architecture (SNA) architecture. The SNA architecture has been utilized for nearly 30 years apparently without a skilled SNA artisan recognizing the desirability of changing how logical units (LUs) are activated in Gateways.

The inventors first identified the following anomalies in the standard SNA architecture while running a "sniffer trace" in the process of debugging a computer program being processed on an SNA network. A "sniffer trace" provides a means for monitoring the operations of a network. During this "sniffer trace," the inventors observed that the Gateway matched its list of active LUs against the actual list of active LUs in the mainframe host computer supporting the SNA network and only established communications links between LUs in the mainframe host computer and LUs in the Gateway where a match could be found.

The accepted practice for initializing Gateways during the past 30 years has been performed as follows. First, a human systems manager configures a Gateway Matrix indicating the LUs connected to the Gateway. FIG. 5 illustrates a typical Gateway Matrix 501, having up to 255 possible LUs 502 for each PU 503 in the matrix. As shown in FIG. 5, the systems manager has not created all of the possible LUs 502 in the Gateway Matrix 501. The set of active LUs 502 in the Gateway Matrix 501 should be matched with a Boundary LU Table in the mainframe host computer representing the LUs at the Gateway edge of the SNA network. The Boundary LU Table in the mainframe host computer is defined in VTAM's configuration files.

Figure 1:
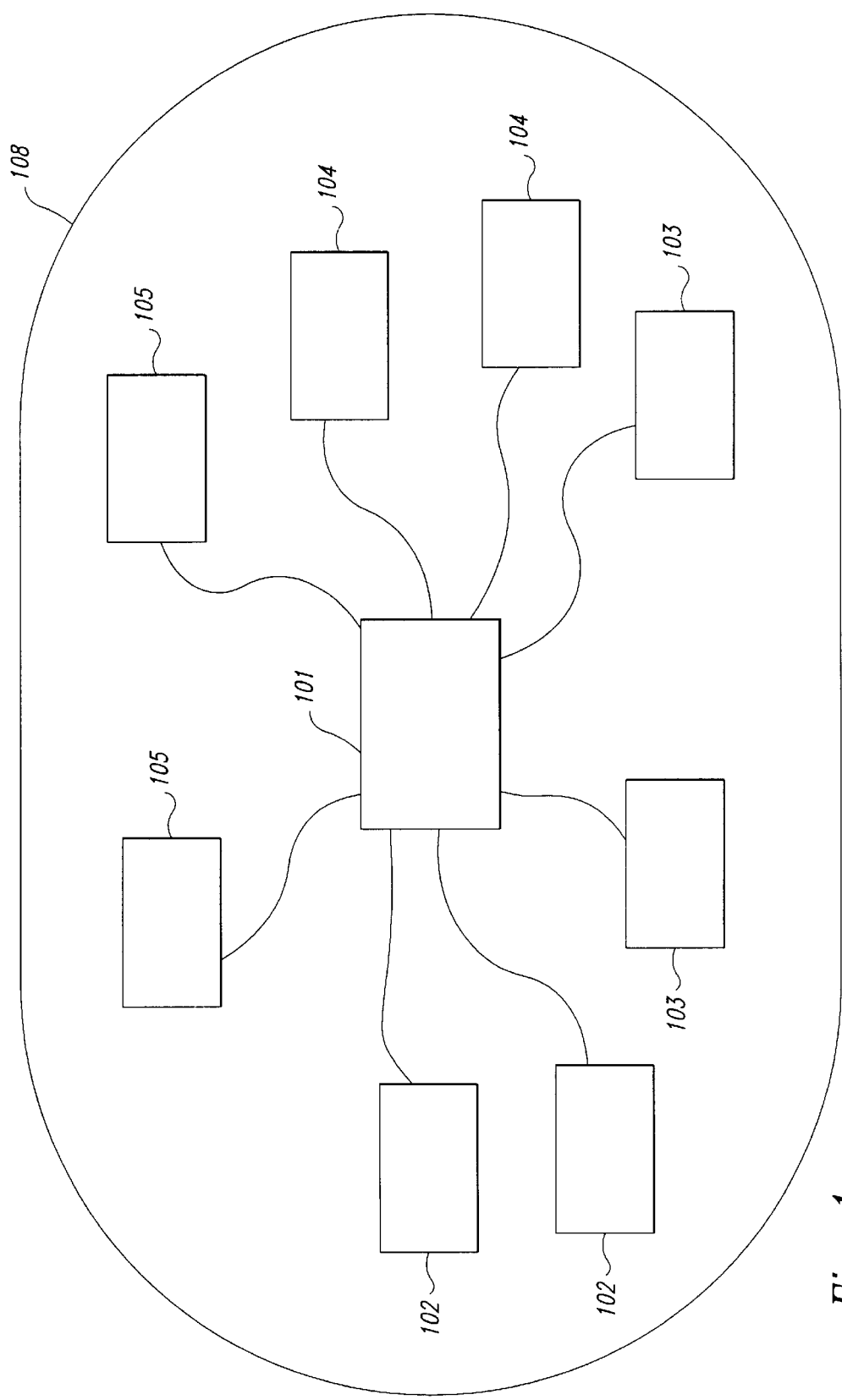
FIG. 1 illustrates a tree-structured architecture utilized by SNA network having a mainframe host computer acting as the network control center.
Figure 2:
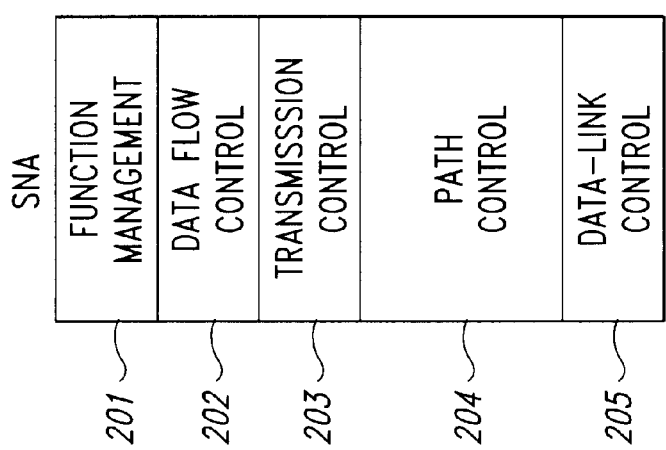
FIG. 2 displays an SNA communication protocol stack used by the SNA network of FIG. 1.
Figure 3:
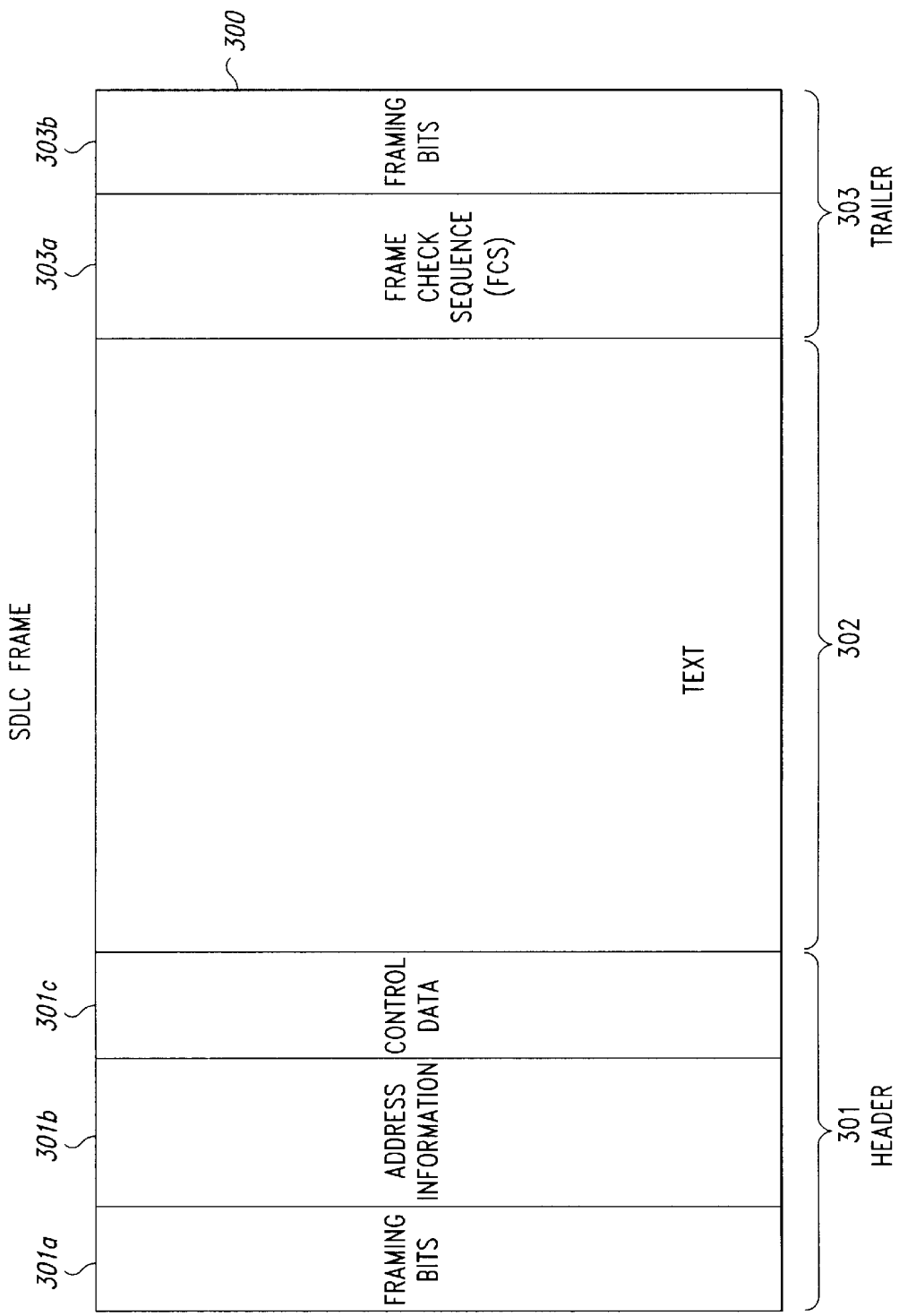
FIG. 3 illustrates the frame structure of the Synchronous Data Link Control (SDLC) protocol utilized by SNA.
Figure 4:
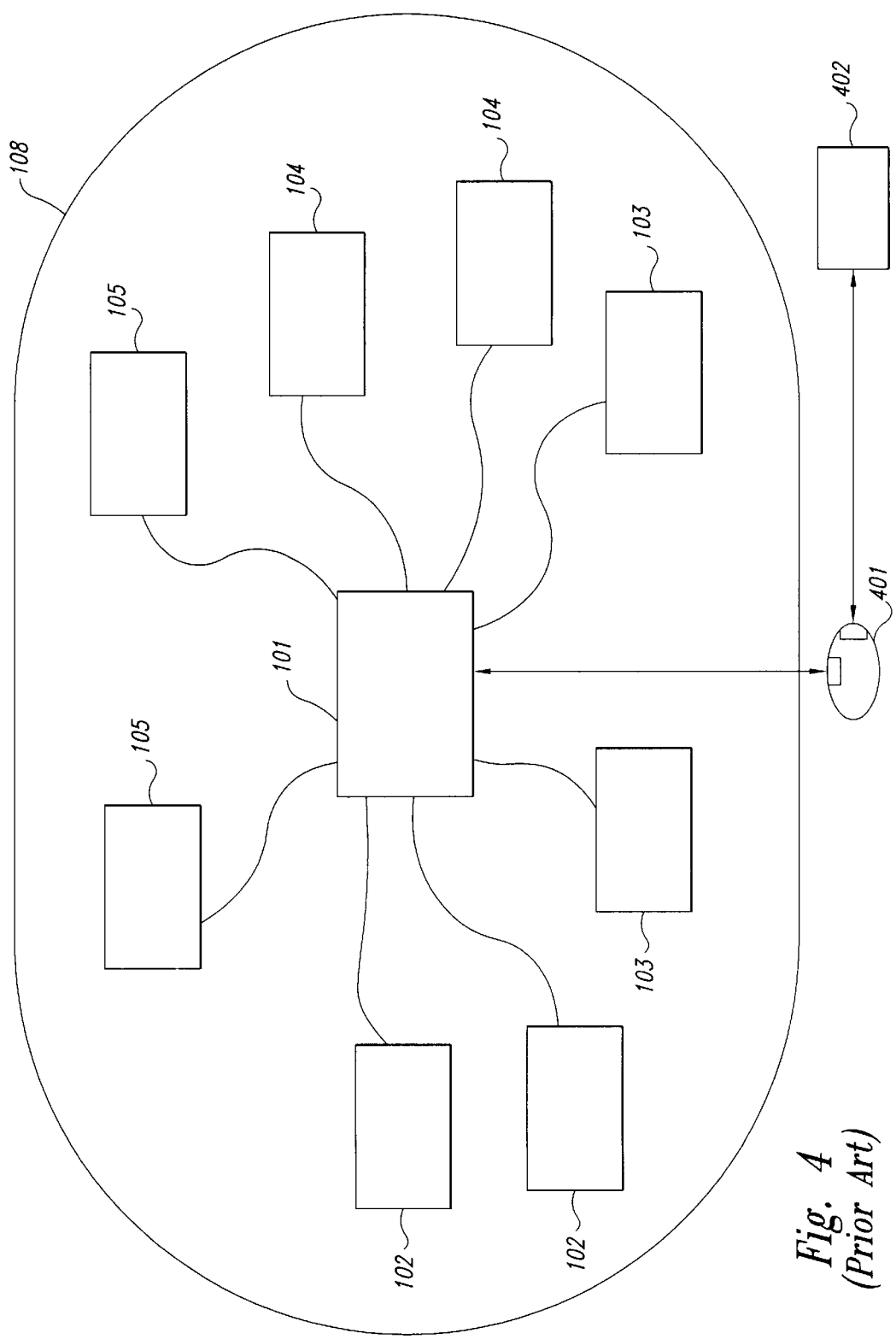
FIG. 4 illustrates a Gateway connecting the SNA network shown in FIG. 1 to another network.
Figure 6:
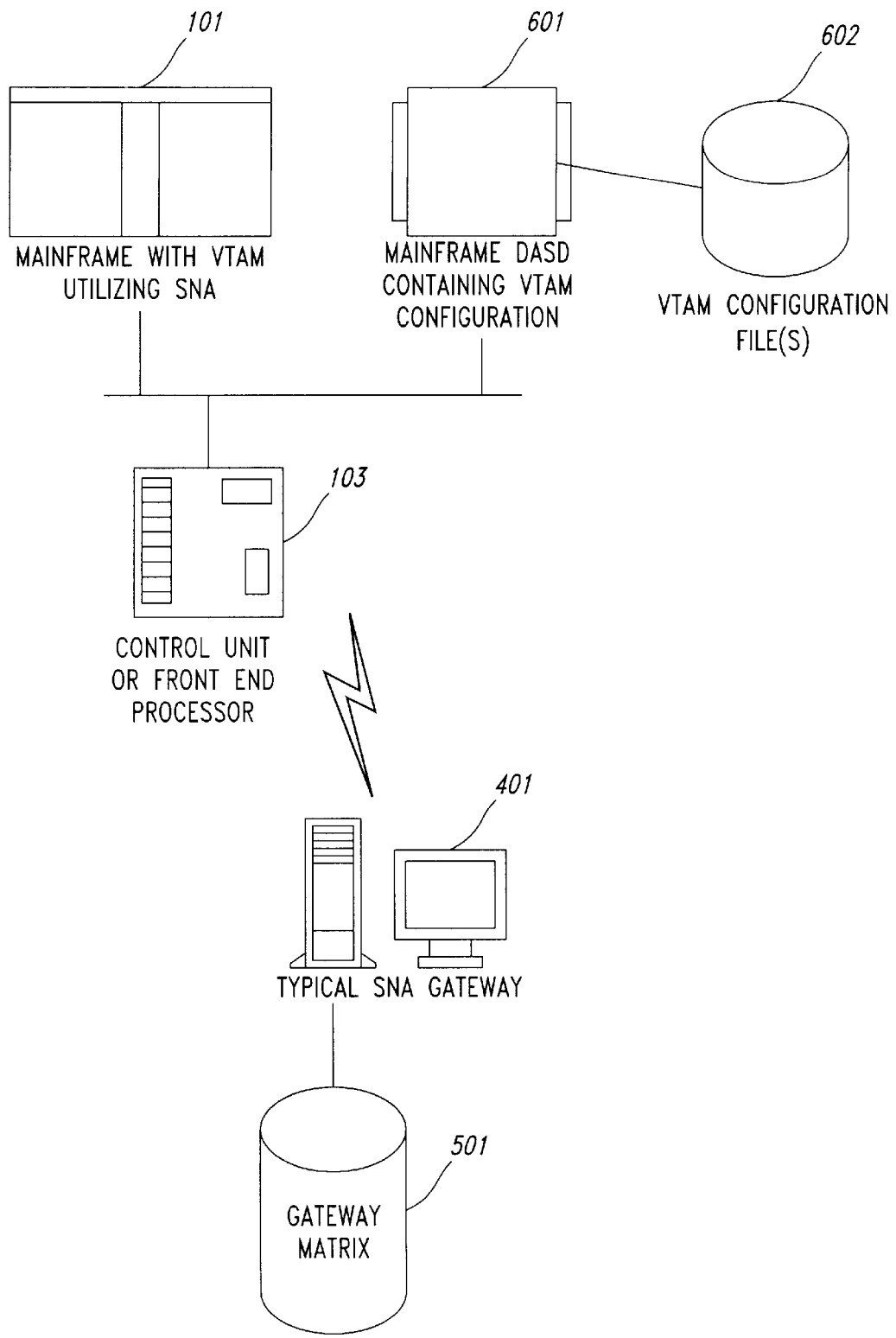
FIG. 6 provides an exemplary prior art SNA network configuration, illustrating the network system components that operate during activation of the Gateway.

FIG. 6 provides an exemplary prior art SNA network configuration, including the SNA Gateway 401 (see FIG. 4), that illustrates the network system components that operate during activation of the Gateway 401. When VTAM determines that a node in the network, such as the Gateway 401, needs to be initialized, VTAM reads the VTAM configuration file for that node, such as the Table of Boundary LUs. The VTAM configuration file contains the PU and LU definitions describing the node and is typically contained in a flat file, a file consisting of records of a single type having no embedded structural information that governs relationships between the records. A mainframe direct access storage drive (DASD) computer 601 accesses the VTAM configuration files 602 and passes the VTAM data to the mainframe host computer 101. A front-end processor 103 may intercede between the mainframe host computer 101 and the SNA Gateway 401.

The communications systems of the SNA network are initialized according to the standard SNA procedures. The network hardware adapter and PUs are loaded into the host mainframe computer 101 as usual. In addition, the LU definitions available to the host mainframe computer are also defined in Resource Pools. The Resource Pool manages and makes available LUs for the use of clients to the mainframe host computer. If an LU is not defined in a Resource Pool, then the network clients may not access it.

VTAM sends a specific Request Unit (RU) known as an "Activate PU" (ACTPU) to the Gateway 401 that informs the Gateway 401 that VTAM now recognizes the Gateway 401 as available for network activity. In response, the Gateway 401 retrieves the PUs in its static configuration such as may be found in the Gateway Matrix 501. If these PUs are found, the Gateway 401 sends a positive sense code to the RU, indicating that the Gateway 401 is available.

VTAM then sends RU known as "Activate Logical Unit" (ACTLU) to signal the Gateway 401 that its LUs are now viewed by the network as online and active. ACTLU includes a list of LUs that the mainframe host computer 101 believes to be active in the Gateway 401. The list of LUs that the mainframe host computer 101 believes to be active are contained in the VTAM configuration files 602 such as the Table of Boundary LUs.

The Gateway 401 again checks its user-defined configuration file, the Gateway Matrix 501, to determine the validity of each LU in the list provided by ACTLU. If the LU is in the Gateway Matrix 501, then the Gateway 401 marks the LU as "Active" and sends ACTLU a positive response code for that LU. If the Gateway 401 does not find a matching LU, then the Gateway 401 responds with either a negative sense code (LU not available) or sends a positive sense code along with an "SLU disabled" control vector that signifies a powered off device.

Figure 7:
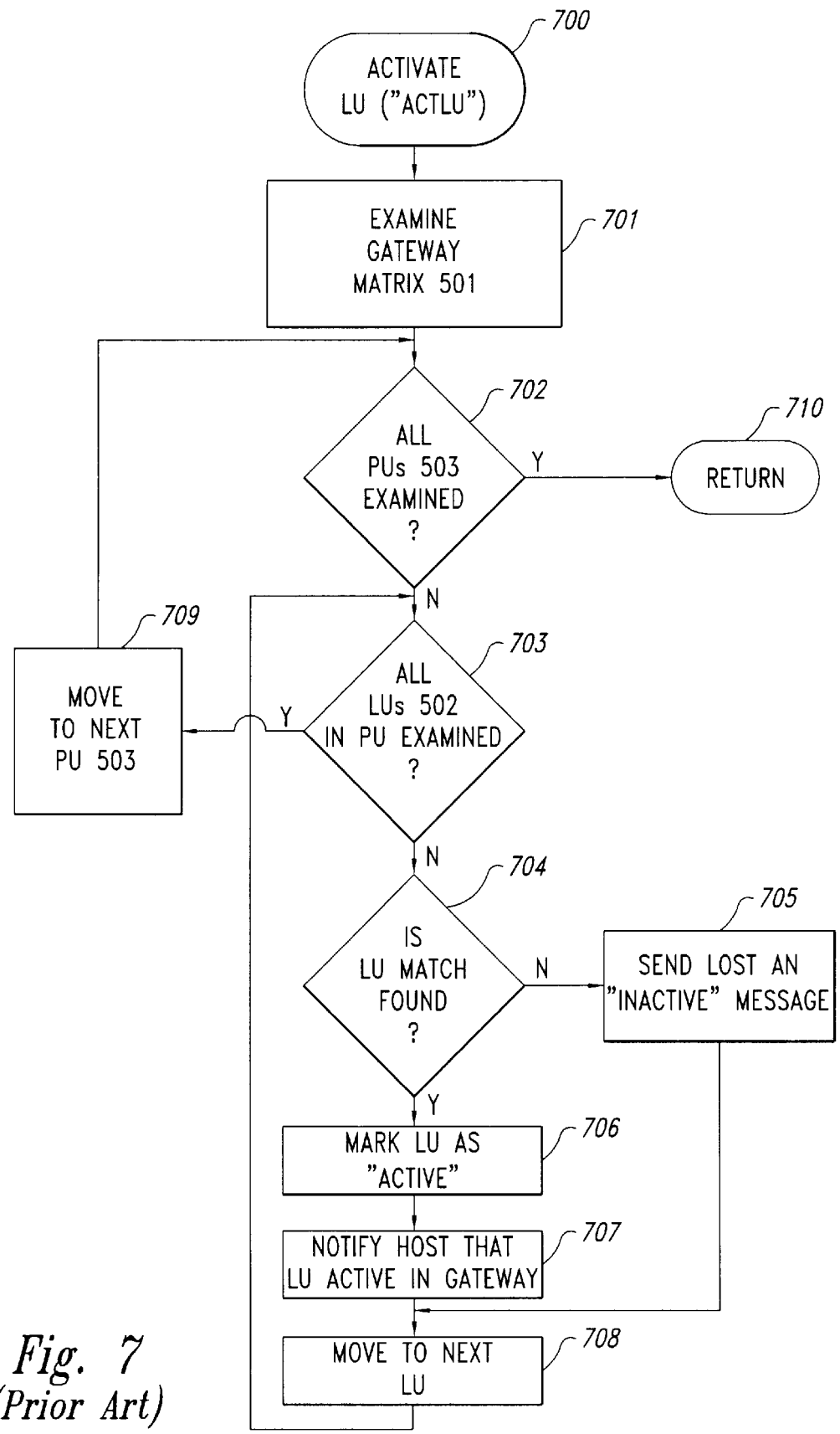
FIG. 7 provides a flowchart illustrating the conventional method for initializing the LU connections between a Gateway and a mainframe host computer.

FIG. 7 provides a flowchart that illustrates the conventional method for initializing the LU connections between a Gateway and a mainframe host computer. As described above, the conventional approach utilizes a static process for building a Gateway Matrix that is later verified using an ACTLU procedure 700. In essence, ACTLU 700 performs a verification for correctness procedure on the Gateway Matrix 501.

The ACTLU procedure 700 examines the Gateway Matrix 501 (step 701). When all of the PUs 503 in the Gateway Matrix 501 have been examined (step 702), then the ACTLU procedure 700 ends (step 710). The ACTLU procedure 700 examines each row of LUs 502 in the columns of PUs 503. Accordingly, the ACTLU procedure 700 next determines if all of the LUs 502 in the present PU 502 have been examined (step 703). If all of the LUs 502 in the present PU 503 have been examined, then the ACTLU procedure 700 moves to the next PU 503 (step 709).

As previously discussed, the ACTLU procedure 700 includes a list of LUs numbers provided by the mainframe host computer. The ACTLU procedure 700 determines if the present LU 502 in the Gateway Matrix 501 matches an LU number on its Table of Boundary LUs from the mainframe host computer 100 (step 704). If the ACTLU procedure 700 does not find that the present LU 502 matches an LU number on the list of LU numbers provided by the mainframe host computer 101, then the ACTLU procedure 700 sends the mainframe host computer 101 an "inactive" message (step 705). The ACTLU procedure 700 performs this task by either issuing a negative response or a positive response accompanied by a device power off control vector command. In both cases, the response returned to the mainframe host computer 101 indicates that the Gateway 401 does not control a particular LU number in mainframe host computer's Table of Boundary LUs. The ACTLU procedure 700 then moves to the next LU (step 708).

If the ACTLU procedure 700 finds the present LU 502 in the Table of Boundary LUs from the mainframe host computer 101 (step 704), then the ACTLU procedure 700 marks the LU as active (step 706) and notifies the mainframe host computer 101 that the present LU is active in the Gateway 401 (step 707). This connection between an LU on the Gateway 401 and an LU on the mainframe host computer 101 places the LU in a Resource Pool and allows subsequent traffic to occur over the LUs. The ACTLU procedure 700 then moves to the next LU (step 708).

The standard procedure described above performs adequately and has been accepted for initializing Gateways for many years. Consequently, the vast majority of programmers would not consider this procedure to be a "squeaky wheel."

In contrast to this conventional impression, the inventors recognized that the standard Gateway initialization procedure may cause several problems, none of which had been previously recognized, and all of which reduce the network's efficiency. The first two problems discovered by the inventors arise during the start-up or initialization procedure for an SNA Gateway. The third problem discovered by the inventors arises during operation of the SNA Gateway.

As previously mentioned, a single PU may contain definitions for up to 255 LUs. If the programmer defines each of the 255 LUs as "available" while VTAM lists only 100 as "active," then there are 155 LUs that the Gateway believes are "active" when they are, in fact, not active in the mainframe host computer. The 155 mixed status LUs essentially constitute "land mines" on the Internet super highway that will produce no good results if utilized and may even cause harm in some instances.

Figure 8A:
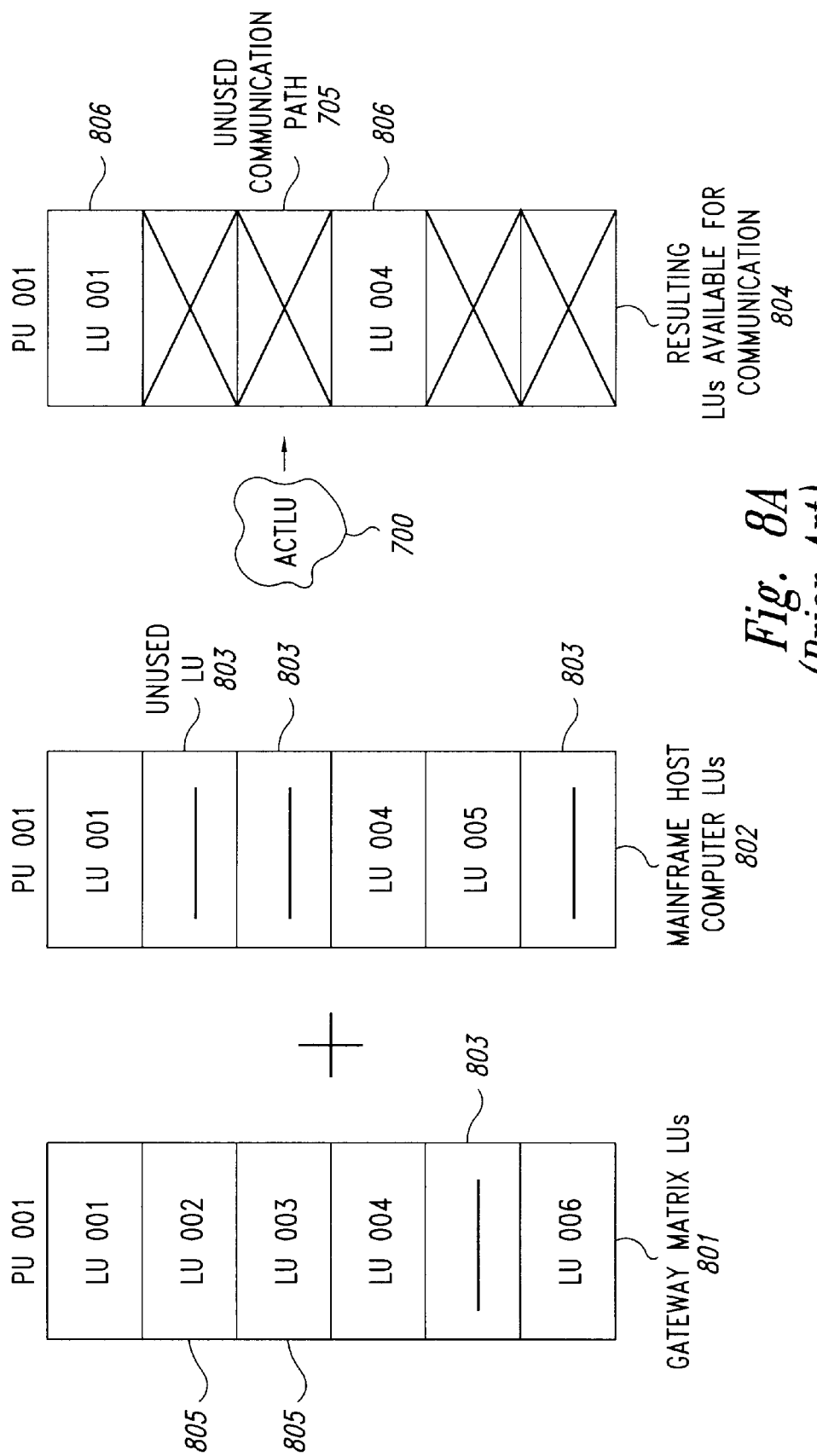
FIGS. 8A and 8B illustrate problems associated with the convention procedure for initializing the LUs in a Gateway.

FIG. 8A illustrates this first prior art problem using a Gateway Matrix having one PU and six LUs. As shown in FIG. 8A, the Gateway Matrix LUs 801 are matched with the mainframe host computer's Table of Boundary LUs 802 by the ACTLU procedure 700. The mainframe host computer's Table of Boundary LUs 802 contains three unused LUs 803, and the Gateway Matrix LUs 801 also contains one unused LU 803. As discussed above, for an active LU connection to be established, an LU from the Gateway Matrix LUs 801 must match an LU from the mainframe host computer LUs 802. Accordingly, the resulting list of LUs available for communication 804 only contains two LUs 806 available for communication. The ACTLU procedure does not change the Gateway Matrix 801. Thus, two LUs 805 will remain marked as open coming into the Gateway but have no corresponding active LU in the mainframe host computer. Under some circumstances, this may lead to anomalous conditions in the computer network.

Another problem arises when the programmer lists fewer LUs in the Gateway as "available" than VTAM lists as "active." For example, the Gateway lists 30 LUs as being "available" while VTAM considers all 255 to be "active." As a result, the Gateway has 225 LUs that could have been used. Since these LUs can never be used because they do not have a matching LU in the Gateway Matrix, they waste processing cycles in the computing system each time they are encountered. In addition, by not utilizing LUs that could have been utilized, the network has a smaller bandwidth than would otherwise have been available.

Figure 8B:
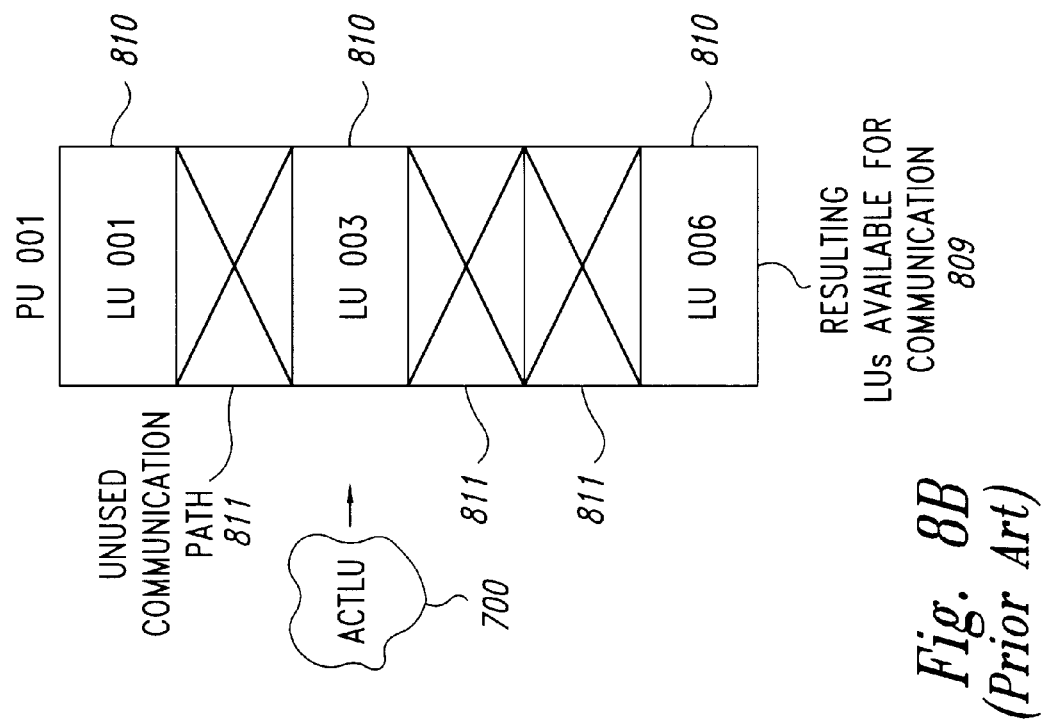
Figure 8B:
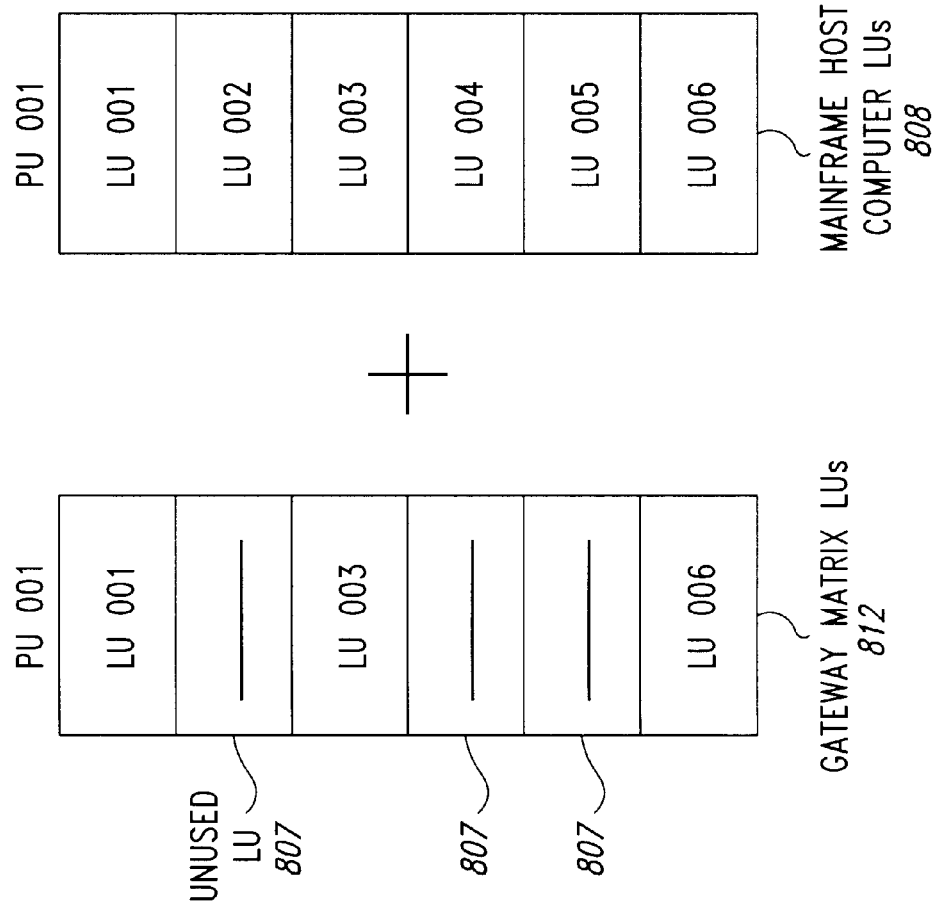

FIG. 8B illustrates this second prior art problem using a Gateway Matrix lo having one PU and six LUs. As shown in FIG. 8B, the Gateway Matrix LUs 812 are matched with a list of mainframe host computer LUs 808 by the ACTLU procedure 700. The mainframe host computer LUs 808 contains no unused LUs 807, and the Gateway Matrix LUs 812 contains three unused LUs 807. As discussed above, for an active LU connection to be established, an LU from the Gateway Matrix LUs 812 must match an LU from the mainframe host computer LUs 808. Accordingly, the resulting list of LUs available for communication 809 only contains three LUs 810 available for communication and three unused LUs 811. The ACTLU procedure does not change the Gateway Matrix LUs 812. Thus, the three LUs 807 will remain marked as unused. However, since the mainframe host computer indicates that these LUs are active, then the mainframe host computer will waste processing cycles on these LUs. In addition, the computing network will utilize a smaller bandwidth than would otherwise have been available.

Both of the above problems may occur at start up. Another problem occurs when the LU connections in the Gateway change while the SNA network is up and running. The number of active LUs can also change dynamically during operation if one of the LUs marked active by VTAM becomes inactive at the Gateway. In this way, the Gateway dynamically become out of sync with VTAM.

Having recognized these problems, the inventors then set about finding a solution that initializes the Gateway while also averting the problems discussed above. The inventors noted that information on the correct set of LU connections lies in the mainframe host computer and not in the Gateway. The inventors then realized that rather than using the mainframe host computer's Table of Boundary LUs merely for verification, this data could instead be used to perform the initialization procedure itself. Thus, the inventors decided to use ACTLU, or a similar procedure, not for its conventional correctness purpose but for specifying the configuration of the Gateway. The inventors created a revised ACTLU procedure that determines which LUs are active in the Table of Boundary LUs in order to resolve the set of active LUs in the Gateway Matrix.

The inventors' solution frees the human Gateway administrator from having to statically define LUs and LU Pools (devices and pools of devices) for client connectivity. Now, the Gateway administrator need go no further than defining the network adapter and the PUs (as before), and the normal SNA communication processes will utilize the activation sequences with VTAM to determine the LUs that VTAM has defined for each of the statically defined PUs and initialize the LUs accordingly, placing newly discovered LUs in an LU Resource Pool. Thus, the inventors' solution provides fuller and more accurate usage of the LUs in an SNA network.

Figure 9:
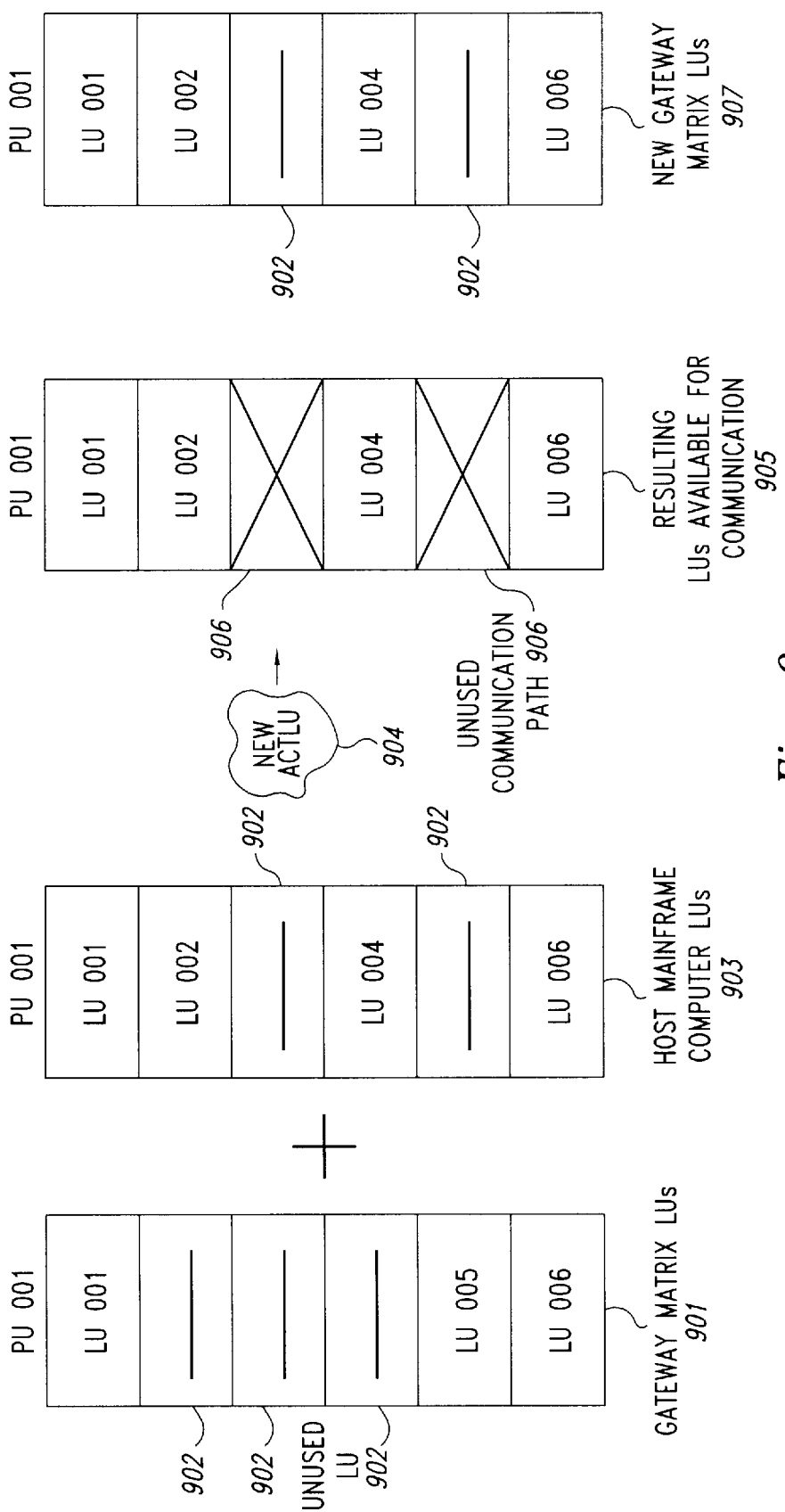
FIG. 9 illustrates the LUs available for communication and the new Gateway Matrix LUs, according to an embodiment of the present invention.

FIG. 9 illustrates the LUs available for communication and the new Gateway Matrix LUs, as provided by an embodiment of the present invention. As shown in FIG. 9, the Gateway Matrix LUs 901 are matched with a list of mainframe host computer LUs 903 by the new ACTLU procedure 904. The mainframe host computer LUs 903 contains two unused LUs 902, and the Gateway Matrix LUs 901 contains three unused LUs 902. In the prior art ACTLU procedure, an active LU connection could only be established when an LU from the Gateway Matrix matched an LU from the mainframe host computer. As discussed above, the inventors recognized that only the mainframe host computer maintains the correct list of active LUs, so they designed the new ACTLU procedure 904 procedure to resolve all communications paths to resemble the list of active LUs found on the mainframe host computer. In addition, the new ACTLU procedure 904 also modifies the Gateway Matrix LUs 901 to produce a New Gateway Matrix LUs 907 that matches the LUs in the list of mainframe host computer LUs 903. Thus, both the resulting LUs available for communication 905 and the New Gateway Matrix LUs 907 match the mainframe host computer LUs 903. As shown, the resulting LUs available for communication 905 contain two unused LUs 906.

The new ACTLU procedure 904 contrasts with the prior art ACTLU procedure, such as the ACTLU procedure 700 shown in FIG. 7, as follows. Under the prior art ACTLU procedure, the resulting list of LUs available for communication, using the Gateway Matrix 901 and the mainframe host computer's LUs 903, would have only been LU001 and LU006. LU002 and LU004 would not have been used. In addition, the Gateway Matrix 901 would not have been modified to create the new Gateway Matrix LUs 907. Thus, LU005 would still remain marked as available, which could potentially have caused problems for network traffic coming into the Gateway.

Aspects of the present invention may be readily applied to static Gateway environments, such as when the Gateway is started. For example, the appropriate list of active LUs are always marked when the Gateway is started, according to an embodiment of the invention. Of course, not all network system managers start the Gateway with the same frequency. For example, some network system managers restart the Gateway on a daily basis, while others start the Gateway less often, and still others restart the Gateway more often, depending upon their preferences and precise system configuration.

The inventors' dynamic approach is also operable when the list of active LUs changes while the Gateway is still running. Embodiments of the present invention perform adequately in dynamic environments because the accepted SNA network management practice calls for the mainframe host computer to first deactivate the LUs when VTAM adds or removes an LU. Following the addition or subtraction of the LUs, the Gateway is restarted, which in turn activates a procedure that establishes the connections in the Gateway. Thus, updates to the list of active LUs take effect essentially immediately, according to these embodiments of the invention.

An embodiment of the inventors' new ACTLU procedure operates as follows. When VTAM determines that a node in the network, such as the Gateway 401 shown in FIG. 4, needs to be initialized, VTAM reads the configuration file for that node, such as the Table of Boundary LUs. VTAM sends a specific Request Unit (RU) known as an "Activate PU" (ACTPU) to the Gateway 401 that informs the Gateway 401 that VTAM now recognizes the Gateway 401 as available for network activity. In response, the Gateway 401 retrieves the PUs in its static configuration. If these PUs are found, the Gateway 401 sends a positive sense code to the RU, indicating that the Gateway 401 is available.

VTAM then sends an RU "Activate Logical Unit" (ACTLU) that signals to the Gateway 401 that its LUs are now viewed by the network as online and active. ACTLU includes a list of LUs that the mainframe host computer 101 believes to be active in the Gateway 401. The list of LUs that the mainframe host computer believes to be active are contained in the VTAM configuration files 602 (see FIG. 6).

The Gateway 401 again checks its user-defined configuration file, the Gateway Matrix 501, to determine the validity of each LU in the list provided by ACTLU. If the LU is in the Gateway Matrix 501, then the Gateway 401 marks the LU as "Active" and sends the ACTLU with a positive response code for that LU. If the Gateway 401 does not find a matching LU, and the link to the mainframe host computer is configured to discover LUs, the Gateway 401 merges the LU described in the ACTLU with any static configuration information at its disposal, such as the Gateway Matrix 501, to create a new LU and then marks the new LU as "Active." The Gateway 401 then responds with a positive sense code, with an "SLU disabled" control vector signifying a powered off device. If the link to the mainframe host computer for this LU is not configured to accept LU discovery, a negative sense code is returned to VTAM in response to the ACTLU, and the device is not added to the Resource Pool of available devices available to the SNA network.

Figure 10:
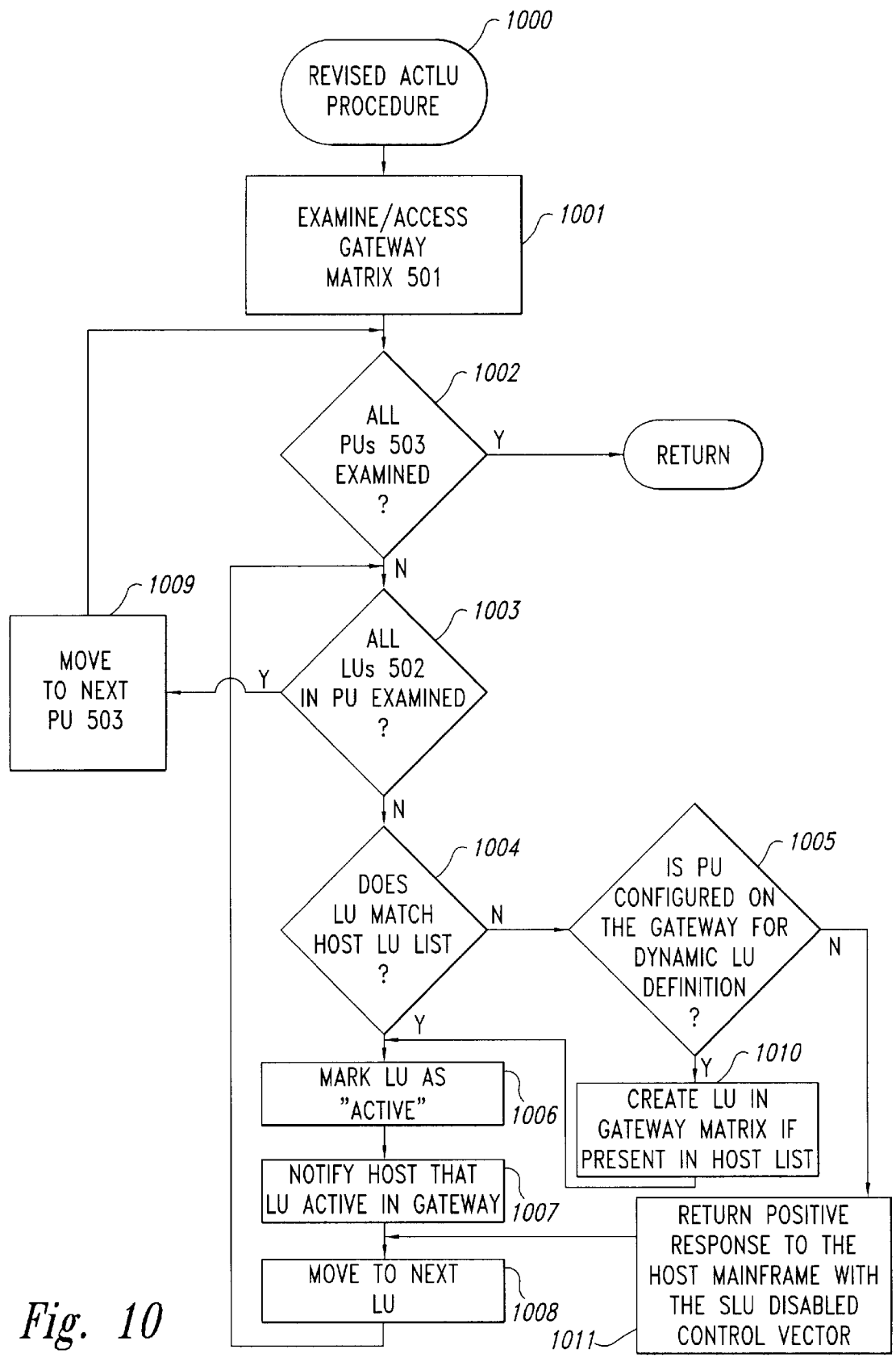
FIG. 10 provides a flowchart illustrating an embodiment of the present invention.

FIG. 10 provides a flowchart illustrating an embodiment of the present invention. As described above, the invention resolves the data regarding the LUs in the Gateway Matrix, such as the Gateway Matrix 501 shown in FIG. 5, with the data regarding the LUs stored in the mainframe host computer. A revised ACTLU procedure 1000 performs the initialization procedure.

The communications systems of the SNA network are initialized according to the standard procedures. The network hardware adapter and PUs are loaded into the mainframe host computer as usual. In addition, the LU definitions available to the mainframe host computer are also defined in Resource Pools, in the manner previously discussed.

The revised ACTLU procedure 1000 examines the Gateway Matrix 501, if one is available (step 1001). If the Gateway matrix 501 has not been previously created. then the ACTLU procedure 1000 may ensure that the Gateway matrix is created if needed. Since information must no longer be set by a human systems manager, the Gateway matrix may not exist prior to the initialization procedure in many instances.

When all of the PUs 502 in the Gateway Matrix have been examined (step 1002), then the new ACTLU procedure ends. Until the end of the PU list is reached, the new ACTLU procedure examines each row of LUs in the columns of PUs. Accordingly, the new ACTLU procedure determines if all of the LUs 502 in the present PU have been examined (step 1003). If all of the LUs 502 in the present PU 503 have been examined, then the new ACTLU procedure 1000 moves to the next PU 503 (step 1009).

If all the LUs 502 in the present PU have not been examined (step 1003), then ACTLU procedure examines the present LU 502. If the new ACTLU procedure cannot find a match between the present LU 502 in the Gateway Matrix 501 and the list of LUs from the mainframe host computer (step 1004), then the new ACTLU procedure determines if the PU is configured on the Gateway for dynamic LU definition (step 1005). If the PU has not been configured on the Gateway for dynamic LU definition, then the new ACTLU procedure returns a positive response to the mainframe host computer 101 with an SLU disabled control vector (step 1011). If the mainframe host computer 101 has been configured for dynamic LU definition (step 1005), then the new ACTLU procedure creates an LU in the Gateway Matrix when the LU is present in the Table of Boundary LUs on the mainframe host computer 101 (step 1010).

If the new ACTLU procedure determines that the present LU 502 is found in the Boundary LU Table in the mainframe host computer (step 1004) or if a new LU is created in the Gateway Matrix 501 (step 1010), then the new ACTLU procedure 1000 marks the LU as "Active" (step 1006). The new ACTLU procedure notifies the mainframe host computer 101 that the present LU is active in the Gateway 401 (step 1007). The connections established by the new ACTLU procedure between an LU on the Gateway and an LU on the mainframe host computer allows subsequent traffic to occur over the LUs. The new ACTLU procedure then moves to the next LU (step 1008) and returns to step 1003 until all LUs 502 have been examined.

Embodiments of the invention may be described in pseudo code. Table 1 below provides exemplary pseudo code for configuring the PUs and LUs in the SNA network at start-up. A pointer variable, Ptr_PU, points to the first PU in the SNA Gateway's list of PUs. Configuration data is then retrieved from the PU and then added to the configuration memory in the mainframe host computer. Configuration data is then read for each LU of the PU's LUs using the pointer variable Ptr_LU. Each LU's configuration data is then added to the configuration memory of the Boundary LU Table in the mainframe host computer. Finally, each LU is added to the network client Resource Pool. The Resource Pool is used to satisfy network client requests to use a LU. After processing the PU heading the list of PUs in the SNA Gateway, Ptr_PU then processes the remaining PUs in the list one at a time.

TABLE 1

```
Configure_SNA_Gateway(SNA_Gateway(Network PUs))
Pointer Variable Ptr_PU. Ptr_LU;
{
  Ptr_PU = SNA_Gateway(Network PUs);
  While (Ptr_PU <>NUL)
    {
      Read static configuration data for Ptr_PU;
      Add Ptr_PU to static configuration memory allocated in
```

TABLE 1-continued

```
      the SNA gateway computer;
      Ptr_LU = Ptr_PU LUs;
      While(Ptr_LU <>NUL)
        {
          Add Ptr_LU to static configuration memory allocated
                            in the SNA gateway computer;
          /* The static configuration memory is also referred
              to as the "Boundary LU Table" */
          Add Ptr_LU to the network client resource pool;
          Ptr_LU++;
        }
      Ptr_PU++;
    }
}
```

The processing of SNA run-time requests is described in pseudo code in Table 2 below. The SNA_Run_Time_Processing( ) routine may be called continuously during the operation of the SNA network. The SNA_Run_Time_Processing( ) routine receives from VTAM an SNA Request Unit (RU). If the RU equals "ACTPU," then the routine attempts to determine if the request refers to a PU already stored in memory from the Configure_SNA_Gateway( ) routine above, or if the PU is new. If the PU is not presently found in memory, then a negative response is issued. Otherwise, a positive response is issued.

If the SNA_Run_Time_Processing( ) routine receives an RU that equals "ACTLU," then the routine attempts to determine if the request refers to an LU already stored in the Boundary LU Table discussed above with regard to the Configure_SNA_Gateway( ) routine. If the LU cannot be located in static memory, then the routine determines if the PU controlling the LU has been configured for dynamic LU discovery. If the PU has been configured for dynamic LU discovery, then the routine formats a positive response with an SLU disabled control vector. A positive response is sent to the VTAM SSCP, and the LU is added to the Resource Pool. If the PU is not configured for dynamic LU discovery, then a positive response is formatted with an SLU disabled control vector. The positive response is sent to the VTAM SSCP but the LU is not added to the Resource Pool. Thus, the LU is in effect invisible to both VTAM SSCP on the mainframe host computer, and to network clients requesting services of the SNA Gateway.

Finally, if the SNA RU is any other type of request, then the routine sends the RU to the SNA communications engine for normal processing. The SNA communications engine may be the SSCP in some embodiments of the invention.

TABLE 2

```
SNA_run_time_processing(VTAM(SNA_Request_Unit))
{
    If (SNA_Request_Unit Type = 'ACTPU')
        Then
          {
          /* See Configure_SNA_Gateway() above */
          If ('ACTPU' = a PU static configuration
                              memory)
            {
              Then
                {
                Format an 'ACTPU' Positive response;
                Send the positive response to VTAM SSCP;
                }
              Else
                {
                Format a 'ACTPU' negative response sense
```

TABLE 2-continued

```
                        code;
        Send the negative response to VTAM SSCP;
                }
            }
        }
Else
    {
    If (SNA Request Unit Type Equals 'ACTLU')
        Then
            {
            /* Attempt a "Boundary LU Table" lookup for
                    the LU in the 'ACTLU' */
            If ('ACTLU' is a statically configured LU)
                Then
                    {
                    Format an 'ACTLU' Positive
                            response with a SLU_Disabled
                                    control vector;
                    Send the positive response
                            to VTAM SSCP;
                    }
                Else
                    {
                    If (The PU owning this LU is
                                    configured for
dynamic LU
    discovery)
                    Then
                        {
                        Format a 'ACTLU' Positive
                                    response with a
SLU_Disabled
    control vector;
                        Send the positive response
                                to VTAM SSCP;
                        Add the LU to the resource pool
                        }
                        Else
                            {
                            Format a 'ACTLU' Positive
                                        response with a
SLU_Disabled
    control vector;
                            Send the positive response
                                    to VTAM SSCP;
                            }
                        }
                    }
                }
    If (SNA Request Unit Type =
                All Other Request_Units (RUs))
        {
        Dispatch the RU to SNA communications engine for
        normal processing;
            }
}
```

In an alternative embodiment of the invention, no dependent LUs are defined on the Gateway, and the dependent Logical Unit Activation Request (ACTLU) is used to specify that the Logical Unit definition on the Gateway needs to be created, and the status of the newly created Logical unit needs to be set to "Active." The newly created LU is then added to a pool of resources that may be made available to clients on another network.

In another alternative embodiment of the invention, dependent LUs in the mainframe host computer may be utilized in the creation of matching dependent LUs in the Gateway Matrix. Once the matching dependent LUs have been created, then a pipe may be created from a dependent LU in the mainframe host computer to a new dependent LU in the Gateway Matrix. A pipe is a portion of a computer's memory that can be used by one process to pass information along to another process. Thus, in this embodiment, a client may send a request to create an LU at a Gateway. The mainframe host computer then creates an LU and passes it to the client. This embodiment of the invention essentially entails creating a dependent LU so that the configuration on the client matches that of the mainframe host computer.

Figure 11:
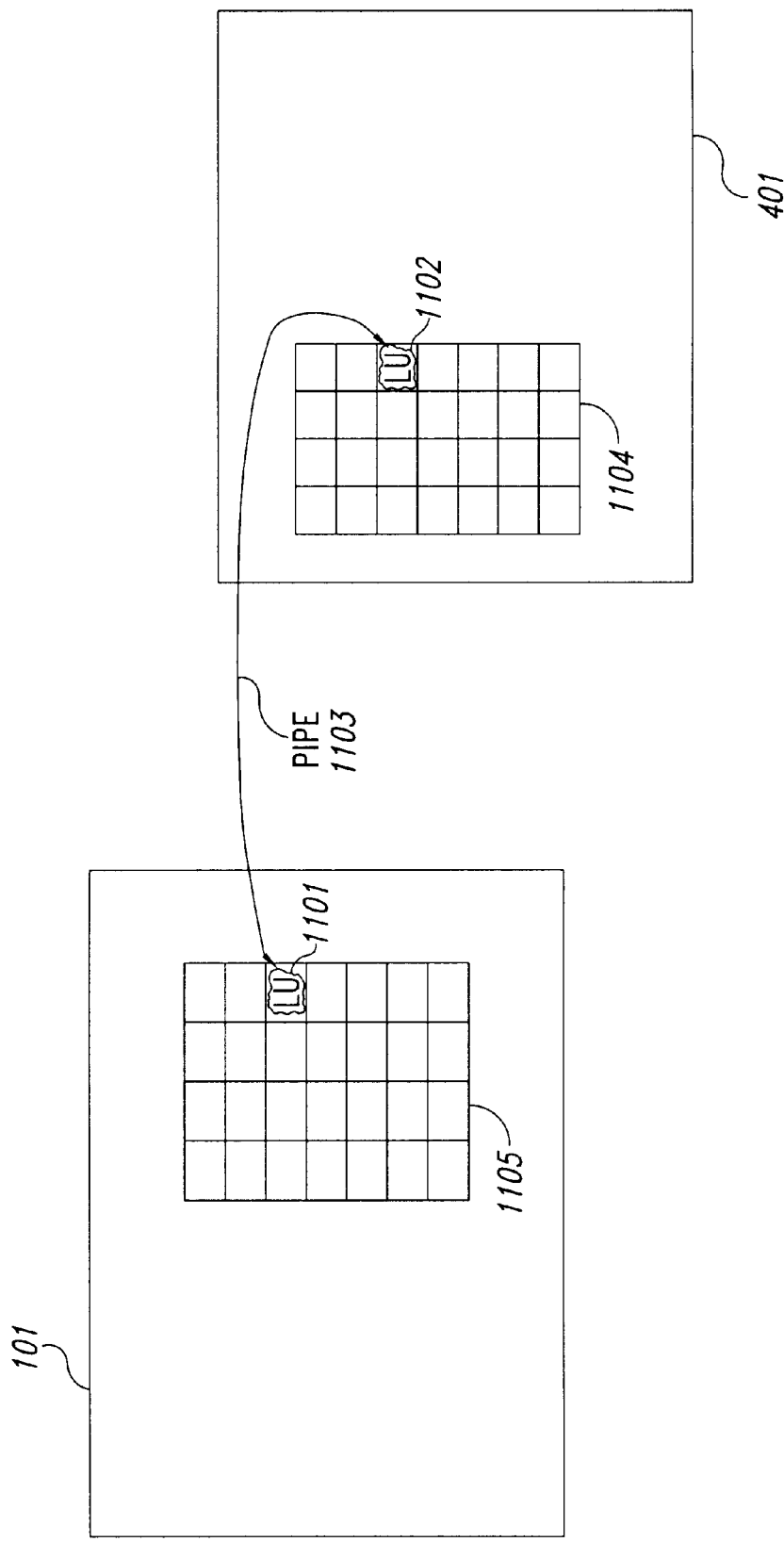
FIG. 11 illustrates an alternative embodiment of the invention in which a dependent LU on the mainframe host computer creates a dependent LU in the Gateway and then establishes a pipe for communications.

FIG. 11 illustrates an alternative embodiment of the invention in which a dependent LU on the mainframe host computer is utilized in the creation of a dependent LU in the Gateway 401 and then a pipe is established for communications between the matching LUs. As shown in FIG. 11, the mainframe host computer 101 contains a list of the active LUs 1105 in the mainframe host computer 101. The Gateway 401 contains a Gateway Matrix 1104. After examination of the Gateway Matrix 1104 reveals that the Gateway Matrix does not contain an LU matching dependent LU 1101 of the mainframe host computer 101, then a modified ACTLU or similar procedure creates a dependent LU 1102 in the Gateway Matrix 1104.

In yet another alternative embodiment of the invention, the Gateway administrator may utilize a hybrid approach in which the administrator defines a subset of the LUs under the PUs and lets the Gateway discover any LUs that have been left out in the manner described above.

In another embodiment of the invention, the Gateway administrator may still configure the Gateway by the prior method (completely static) and prevent VTAM from executing the LU discovery procedure. In this embodiment, the Gateway administrator receives a list of LUs from the VTAM systems programming staff, types the list into the Gateway's configuration, and manually defines the LU Resource Pool(s). The Gateway administrator then adds the LUs to the Resource Pool(s) making them available to network clients. This process is prone to error, and liable to become out of date quickly. This embodiment of the invention includes a switch that enables the Gateway administrator to disable the dynamic embodiment of the invention disclosed above and process the list according to the prior art procedure.

In an alternative embodiment, the Gateway 401 automatically assigns logical unit type 2 (LU 2) to a particular LU if after the Gateway 401 sends a positive response code with an "SLU enabled" control vector for the particular LU signifying a powered on device to the mainframe computer 101, the mainframe computer does not send a Bind request for the particular LU in a predetermined amount of time. A Bind request starts an SNA session between two logical units. Positive "SLU enabled" responses by the Gateway 401 occur for cases including the following: where the PU is configured on the Gateway 401 for dynamic LU definition, where the PU is configured on the Gateway 401 for static LU definition and the definition has been chosen to be indeterminate, where an LU is listed both on an ACTLU and on the Gateway Matrix 401, and where a positive "SLU enabled" response by the Gateway is initiated by a process timer.

By automatically assigning an LU type 2 designation to an LU in the absence of a Bind request within a certain predetermined amount of time, this alternative embodiment frees users from the necessity of manually defining the LU types in the Gateway 401 when printers as well as terminals are involved. In particular, during SNA PU Link initialization, an agent process is initialized having a timer to determine the duration between the time that the mainframe host computer 101 sends an ACTPU to the Gateway 401 and the time that the Gateway 401 sends the first ACTLU response back to the mainframe host computer 101 in response to the ACTLU sent by the mainframe host computer 101 to the Gateway 401. This duration is designated as "net-lat" for network latency time.

For each LU in the list of LUs of the ACTLU, the Gateway 401 then sends either a positive response code with an SLU enabled control vector, a positive response code with an SLU disabled control vector, or a negative response code, all as described above. When the Gateway 401 sends a positive response code with an SLU enabled control vector for a particular LU, the Gateway waits a wait period to receive an SNA Bind for the particular LU from the mainframe host computer 101. The wait period is equal to the net-lat duration plus an additional delay time. The additional delay time is chosen to account for such things as delays caused by properly operating virtual or physical connections to the mainframe host computer 101 involved with the Bind requests. For instance, the additional delay time is chosen to provide ample time for the mainframe host computer 101 to issue a Bind request for a printer or batch terminal with pent-up demand. For one embodiment, this additional delay time is chosen as 15 seconds. In other embodiments, this additional delay time is chosen as other periods of time such as 5 or 30 seconds.

If after waiting the wait period the Gateway 401 does not receive an SNA Bind from the mainframe host computer 101, the Gateway designates the particular LU in the Gateway Matrix 501 as an LU type 2 device, which, in particular, is a 3270-type computer terminal. After automatically designating the particular LU as an LU type 2, the Gateway 401 then sends a power off notify "SLU disabled" control vector to the mainframe host computer 101. This automatic designation in the Gateway Matrix 501 by the Gateway 401 regarding LU type for no Bind request being received by the Gateway within a predetermined amount of time eliminates the need for human intervention to manually designate the LU type in the Gateway Matrix.

Figure 12:
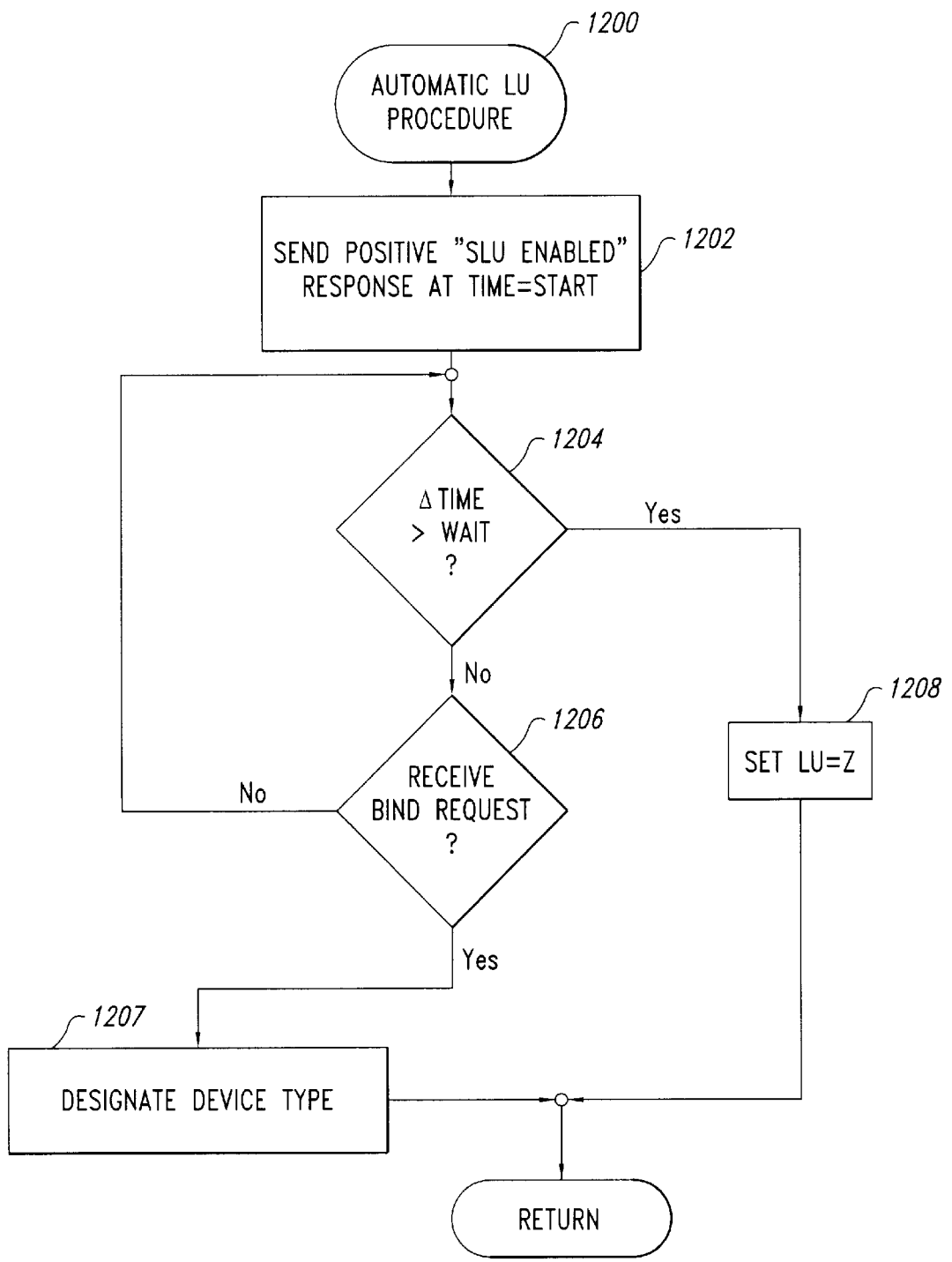
FIG. 12 is a flowchart illustrating another alternative embodiment of the present invention in which the Gateway further estimates and assigns a logical unit type to a logical unit based upon whether the mainframe host computer sends a Bind request within a predetermined amount of time.

The automatic designation of LU type 2 of the alternative embodiment can be summarized by the automatic LU procedure 1200 of FIG. 12. The automatic LU Procedure 1200 first sends a positive response code with an SLU enabled control vector at a start time. The automatic LU procedure 1200 then determines if the difference between the present time and the start time is greater than the wait period, which is net-lat plus an additional delay time such as 15 seconds (step 1204). If the difference between the present time and the start time is not greater than the wait period, the automatic LU procedure 1200 determines if a Bind request has been received by the Gateway 401 (step 1206). If a Bind request has been received, the automatic LU procedure 1200 examines the Bind request and designates the device type (such as type 1, 2, or 3) according to the Bind request (step 1207). The automatic LU procedure 1200 then ends. If a Bind request has not been received by the Gateway 401, then the automatic LU procedure 1200 branches back to determine if the difference between the present time and the start time is now greater than the wait period (step 1204) and if so, sets the LU type to LU 2 (step 1208) and ends.

The assumption behind this automatic designation of LU type 2 is that printers being LU type 1 or 3 have a pent up demand of jobs that will cause the mainframe host computer 101 to send a Bind request within the wait period after receiving a positive response code with an SLU enabled control vector from the Gateway 401. This alternative embodiment is particularly useful for the PU 2.0 protocol since PU 2.0 generally involves LU 1, LU 2, and LU 3 devices with LU 1 and LU 3 generally related to printers and LU 2 related to terminals. LU 1 also relates to batch terminals such as 3770 RJE terminals that in general also, like the printers, have a pent up demand so will generally have a Bind request sent by the mainframe host computer 101 within the wait period as well. Other embodiments may be directed to other protocols such as PU 2.1, but have additional complications since PU 2.1 also involves LU 7 terminals. Some self-correcting mechanisms may help alleviate some of these complications for cases where the assumption described above fails.

For a case where the assumption fails, such as for a case involving the PU 2.0 protocol where an LU 1 or 3 printer or an LU 1 batch terminal does not have a pent up demand, a Bind request will not be issued by the mainframe host computer 101 within the wait period after receiving a positive response code with an SLU enabled control vector from the Gateway 401. In this case, the Gateway 401 will initially incorrectly designate in the Gateway Matrix 501 an improper LU type 2 for a particular LU having an LU 1 or LU 3 type. This incorrect designation, however, is self-correcting because once a user sends a request to the Gateway 401 to use the particular LU, the Gateway will then send a "notify" "SLU enable" to the mainframe host computer 101. The mainframe host computer 101 will then respond by sending a Bind request that will contain the proper identification of LU type, such as LU 1 or LU 3, for the Gateway 401 to use to correct its logical type entry for the particular logical unit in the Gateway Matrix 501. It should be noted that this correction process is also done without need for user intervention to manually correct the Gateway Matrix 501, so the reduction in manual user intervention is maintained even when the basic assumption behind the automated LU type 2 designation is incorrect for a particular case.

In an alternative embodiment, a process timer initiating a positive "SLU enabled" response, is used to postpone establishment of an LU session to moderate demand on the mainframe host computer 101. Instead of the Gateway 401 initially sending positive response codes with SLU enabled control vectors for the many LUs listed in an ACTLU received by the Gateway, where such responses would be otherwise appropriate, the Gateway sends positive response codes with SLU disabled control vectors. The mainframe host computer 101 is then not burdened with sending out a multitude of Bind requests to establish sessions all within a short period of time. After the initial group of "SLU disabled" responses, the Gateway 401 sends SLU enabled control vectors in staggered succession for these LUs having postponed establishment of LU sessions. Once the mainframe host computer 101 receives these "SLU enabled" responses the mainframe host computer then sends out Bind requests based upon any pent up demand as described above.

While the present invention has been described with reference to a preferred embodiment thereof, those skilled in the art will appreciate that various changes in form and detail may be made without departing from the intended scope of the present invention as defined in the appended claims. For example, the structure of the Gateway, the Gateway Matrix, and the mainframe host computer may differ from those shown in the drawings. The Gateway and mainframe host computer's actual communications connections with each other may also differ from the functional description described above.

Although specific embodiments of, and examples for, the invention are described herein for illustrative purposes, various equivalent modifications are possible within the scope of the invention, as will be recognized by those skilled in the relevant art. The teachings provided herein of the invention can be applied to other computing systems, not necessarily to the SNA computing network described above. Various exemplary computing systems, and accordingly various other system configurations can be employed under the invention. The embodiments of the invention disclosed herein have been discussed with regard to computerized network installations, such as those using large centralized computing systems. However, the invention finds applicability in other computing systems, such as small, portable computerized systems and even hand-held computing devices. For example, instead of a mainframe host computer, the invention is applicable to another type of host computer such as a workstation host computer. The invention also finds applicability in a network of telecommunications devices, such as network telephones that operate under the principles of the invention.

In yet another embodiment of the invention, the procedure for dynamically configuring the LUs is applied to another computing system that operates in a manner similar to the SNA network described above. The method for dynamically configuring logical units may also be applied to telecommunications networks and not necessarily to the exemplary computing network described herein.

Moreover, various aspects of the invention may even be comprised of micro-code provided in various pieces of hardware equipment, provided that the collective operation of the system functions in the manner that has been described.

These and other changes can be made to the invention in light of the above-detailed description. In general, in the following claims, the terms used should not be construed to limit the invention to the specific embodiments disclosed in the specification and the claims, but should also be construed to include all Gateway activation systems that operate under the claims. Accordingly, the invention is not limited by the specific embodiments provided in the disclosure, but instead its scope is determined by the following claims.

What is claimed is:

1. A method for assigning a logical unit type to a logical unit in a Gateway between an SNA network having a host computer and another network in the SNA network, the method comprising:

sending a positive sense code in response to an Activate Logical Unit (ACTLU) Request Unit (RU) for the logical unit, the logical unit having an actual unit type;

measuring time from the sending of the positive sense code; and if no Bind request for the logical unit has been received within a predetermined amount of time from the time of the sending of the positive sense code, then assigning a predetermined logical unit type to the logical unit without having knowledge of the actual unit type of the logical unit.

2. The method of claim 1 wherein the predetermined amount of time is related to demand on the host computer and related to latency involving the SNA network.

3. The method of claim 1 wherein the predetermined logical unit type is logical unit type two.

4. The method of claim 1 wherein the predetermined amount of time is related to an amount of time elapsed between sending an Activate Physical Unit (ACTPU) Request Unit (RU) from the host computer to the Gateway and sending a response to an ACTLU associated with the ACTPU from the Gateway to the host computer.

5. The method of claim 1 wherein the predetermined logical unit type designates a device other than a printer.

6. A computer-implemented method for indicating a logical unit type for a logical unit having an actual logical unit type in a SNA Gateway coupled to a host computer, the computer-implemented method comprising:

sending an "SLU enable" control vector to the host computer signifying that the logical unit is a powered on device;

measuring time from the sending of the "SLU enable" control vector to the host computer; and if no Bind request for the logical unit has been received by the Gateway from the host computer within a predetermined amount of time from the time of the sending of the "SLU enable" control vector, then indicating in the Gateway a predetermined logical unit type for the logical unit without knowledge of the actual logical unit type of the logical unit.

7. The computer-implemented method of claim 6 wherein the predetermined logical unit type is a logical unit type two.

8. The computer-implemented method of claim 6 wherein the predetermined amount of time is based upon latency involving the host computer and the SNA network.

9. A system for associating a logical unit type with a logical unit having an actual logical unit type in an SNA Gateway coupled to a host computer, the system comprising:

a Gateway transmission component configured to send to the host computer a positive sense code in response to an Activate Logical Unit (ACTLU) Request Unit (RU) for the logical unit;

a timer configured to measure an amount of time elapsed from when the Gateway transmission component sends the positive sense code in response to the ACTLU RU for the logical unit; and an assignment unit configured to assign a predetermined logical unit type to the logical unit without knowledge of the actual logical unit type of the logical unit if no Bind request for the logical unit has been received within a predetermined amount of time from the sending of the positive sense code.

10. The system of claim 9 wherein the assignment unit is configured to assign a logical unit type of a Bind request for the logical unit if the Bind request has been received by the Gateway within the predetermined amount of time from the sending of the positive sense code by the Gateway.

11. The system of claim 9 wherein the predetermined logical unit type is logical unit type 2.

12. The system of claim 9 wherein the predetermined amount of time is related to an amount of time elapsed between sending an Activate Physical Unit (ACTPU) Request Unit (RU) from the host computer to the Gateway and sending a response to an ACTLU associated with the ACTPU from the Gateway to the host computer.

13. A data structure that specifies characteristics for each logical unit of a plurality of logical units in a Gateway between an SNA network having a host and another network, each logical unit having an actual logical unit type, the data structure comprising:

a first data field that contains identification data for the each logical unit of a plurality of logical units; and a second data field that contains logical unit type identification data for the each logical unit, the second data field containing a data value indicating a predetermined logical unit type based on whether a Bind request for the each logical unit is received by the Gateway within a predetermined response time.

14. The data structure of claim 13 wherein the predetermined logical unit type is two.

15. A method for programming a Gateway to assign a logical unit type to a logical unit in the Gateway, the Gateway being between an SNA network having a host computer and another network in the SNA network, the method comprising:

programming the Gateway to send a positive sense code in response to an Activate Logical Unit (ACTLU) Request Unit (RU) for the logical unit, the logical unit having an actual unit type;

programming the Gateway to measure time from the sending of the positive sense code; and programming the Gateway that if no Bind request tor the logical unit has been received within a predetermined amount of time from the time of the sending of the positive sense code, then assigning a predetermined logical unit type to the logical unit without having knowledge of the actual unit type of the logical unit.

16. The method of claim 15 wherein the predetermined amount of time is related to demand on the host computer and related to latency involving the SNA network.

17. The method of claim 15 wherein the predetermined logical unit type is logical unit type two.

18. The method of claim 15 wherein the predetermined amount of time is related to an amount of time elapsed between sending an Activate Physical Unit (ACTPU) Request Unit (RU) from the host computer to the Gateway and sending a response to an ACTLU associated with the ACTPU from the Gateway to the host computer.

19. The method of claim 15 wherein the predetermined logical unit type designates a terminal device.

* * * * *

UNITED STATES PATENT AND TRADEMARK OFFICE
CERTIFICATE OF CORRECTION

PATENT NO.    : 6,173,321 B1
DATED         : January 9, 2001
INVENTOR(S)   : Mitchell Owen Peterson and Brian Dudley Silverman It is certified that error appears in the above-identified patent and that said Letters Patent is hereby corrected as shown below:

Claim 15, column 19,
Line 11, "Bind request tor the" should read -- Bind request for the --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*